United States Patent Office 2,783,262
Patented Feb. 26, 1957

2,783,262
HALOPHENOXYSILOXANES

Robert L. Merker, Pittsburgh, Pa., assignor to Dow Corning Corporation, Midland, Mich., a corporation of Michigan No Drawing. Application November 22, 1954,
Serial No. 470,532

5 Claims. (Cl. 260—448.2)

This invention relates to silanes and siloxanes having halophenoxymethyl groups attached to the silicon.

It is known that halophenyl groups attached to silicon in siloxane molecules improves the lubricity of the siloxanes. However, the present commercial methods of preparing such siloxanes is restricted primarily to materials having no more than 2 halogen atoms per phenyl radical. In addition it has been found that when the halophenyl radical is on the end of the siloxane chain improved lubricity is obtained without sacrificing substantially the desirable temperature viscosity coefficient of hydrocarbon substituted siloxanes. The present methods of preparing halophenylsiloxanes makes it quite expensive to prepare fluids having halophenyl groups on the end of the chains only.

It is the object of the present invention to prepare novel compositions of matter which show improved lubricity without sacrificing the other desirable properties of organopolysiloxanes. Another object is to provide economically feasible organosilicon materials which have more than 2 halogen atoms per phenyl radical. Other objects and advantages will become apprent from the following description.

This invention relates to silanes and siloxanes of the average general formula

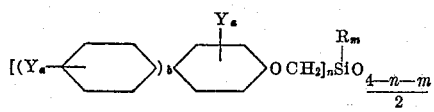

in which Y is chlorine or bromine, $a$ has a value from 1 to 5 inclusive, $b$ has a value from 0 to 1 inclusive, $n$ has a value from 1 to 2 inclusive, $m$ has a value from 0 to 3 inclusive and R is a monovalent hydrocarbon radical or a halogenated aryl hydrocarbon radical.

The compounds of this invention are prepared by reacting alkali metal salts of halophenols with halomethylsiloxanes or halomethylsilanes having 1 or 2 halomethyl groups per silicon atom. The reaction may be represented schematically by the equation

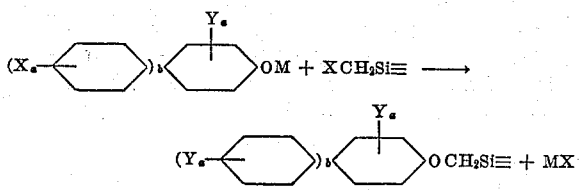

This reaction is best carried out in solvents such as dimethylformamide, pyridine, ethers, aliphatic and aromatic hydrocarbons, and acetonitrile. In general the reaction goes best when the reactants are heated at above 50° C. and is usually carried out at the reflux temperature of the solvent.

For the purpose of this invention any phenol or xenol (i. e., phenylphenol) having at least 1 chlorine or bromine atom substituted on a phenyl ring can be employed. These materials are readily converted to the alkali metal salt by reacting them with alkali metal hydroxides. Specific examples of operative materials are the alkali metal salts of pentachlorophenol, 2-chloroxenol, heptachloroxenol, 2,4,5,6-tetrachlorophenol, 2,4,5-trichlorophenol, tribromophenol, parachlorophenol, 2,4,6-trichloro 3,5-dibromophenol, and dichloroxenol.

In the silanes and siloxanes of this invention R can be any monovalent hydrocarbon radical such as alkyl radicals such as methyl, ethyl, and octadecyl; alkenyl radicals such as vinyl and, allyl; cycloaliphatic hydrocarbon radicals such as cyclohexyl and cyclohexenyl; aralkyl hydrocarbon radicals such as benzyl; aryl hydrocarbon radicals such as phenyl, xenyl and tolyl; and halogenated aryl hydrocarbon radicals such as chlorophenyl, bromoxenyl, and $\alpha,\alpha,\alpha$-trifluorotolyl.

The halomethylsiloxanes or silanes employed in the method of this invention may be prepared by direct halogenation of methyl siloxanes or of methylchlorosilanes. In the latter case the chlorosilane can be hydrolyzed to the siloxane. In those cases where the R groups are susceptible to chlorination it is best first to halogenate a methylchlorosilane and thereafter react the halomethylchlorosilane with RMgX in which R is the desired hydrocarbon radical.

The siloxanes of this invention can be copolymerized with siloxanes of the formula $$R'_z SiO_{\frac{4-z}{2}}$$

in which R' is hydrogen, a monovalent hydrocarbon radical, or a halogenated monovalent hydrocarbon radical and $z$ has a value from 0 to 3 inclusive. These copolymers may be prepared by catalytic acid copolymerization of the various siloxanes. An alternative method is to react the alkali metal salts of the above phenols with a siloxane in which only some of the silicon atoms have halomethyl groups attached thereto.

Specific examples of R' groups which can be in the copolymers of this invention are hydrogen, aliphatic hydrocarbon radicals such as methyl, ethyl, octadecyl, vinyl, allyl; cycloaliphatic hydrocarbon radicals such as cyclohexyl and cyclohexenyl; aralkyl radicals such as benzyl aryl hydrocarbon radicals such as phenyl, tolyl and xenyl and halogenated hydrocarbon radicals such as trifluorovinyl, tetrafluoroethyl, chlorophenyl, chlorotolyl, $\alpha,\alpha,\alpha$-trifluorotolyl and bromonaphthyl. It should be understood that the copolymers of this invention also include those containing $SiO_2$ units. In all cases in the copolymers of this invention there should be at least 1 siloxane unit containing a halophenoxymethyl radical, per molecule.

The siloxanes and silanes of this invention are useful as lubricants and as additives for lubricants.

The following examples are illustrative only and should not be construed as limiting the invention which is properly delineated in the appended claims.

Example 1

96 g. of the sodium salt of pentachlorophenol and 37 g. of bis-chloromethyltetramethyldisiloxane were refluxed in 150 g. of dimethylformamide for 1½ hours. The sodium chloride was removed by filtration and upon removal of the solvent 95 g. of a crystalline solid melting 116.5 to 118° C. was obtained. This material had the formula $(C_6Cl_5OCH_2\overset{Me_2}{\underset{|}{Si}})_2O$

Example 2

The disiloxane product of Example 1 was copolymerized with octamethylcyclotetrasiloxane in the presence of a catalytic amount of sulfuric acid in the amounts shown below. Each product was analyzed for chlorine and each was found to be suitable for lubrication of steel bearing surfaces.

| Grams of (Me₂SiO)₄ | Grams of Me₂<br>\|<br>(C₆Cl₅OCH₂Si)₂O | Average molecular weight | Percent chlorine |
|---|---|---|---|
| 81 | 19 | 3,651 | 9.23 |
| 76 | 24 | 2,911 | 12.2 |
| 73 | 27 | 2,541 | 14 |
| 68 | 32 | 2,171 | 16.4 |
| 62 | 38 | 1,801 | 19.7 |

Example 3

When chloromethylheptamethylcyclotetrasiloxane is reacted with the sodium salt of tribromophenol the compound tribromophenoxymethylheptamethylcyclotetrasiloxane is obtained.

Example 4

When the sodium salt of dichloroxenol is reacted with a copolymer of 5 mol percent chloromethylsiloxane, 94 mol percent phenylmethylsiloxane and 1 mol percent vinyldimethylsiloxane in accordance with the procedure of Example 1 a copolymer of 5 mol percent of dichloroxenoxymethylsiloxane, 94 mol percent phenylmethylsiloxane and 1 mol percent vinyldimethylsiloxane is obtained.

Example 5

When the sodium salt of parachlorophenol is reacted with a copolymer of 1 mol percent chloromethyldimethylsiloxane, 90 mol percent dimethylsiloxane and 9 mol percent chlorophenylmethylsiloxane a copolymer having the composition 1 mol percent parachlorophenoxymethyldimethylsiloxane, 90 mol percent dimethylsiloxane and 9 mol percent chlorophenylmethylsiloxane is obtained.

Example 6

When 4 mols of the potassium salt of 2,4,6-trichloro 3,5-dibromophenol is reacted with 1 mol of tetrachloromethyldimethyldisiloxane in the manner of Example 1, the compound

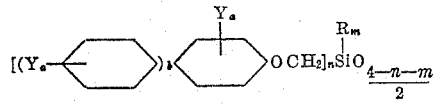

is obtained.

Example 7

While 1 mol of the sodium salt of pentachlorophenol is reacted with 1 mol of chloromethyl chlorophenyl octadecyl allyl silane in accordance with the procedure of Example 1, the compound pentachlorophenoxymethyl chlorophenyl octadecyl allyl silane is obtained.

That which is claimed is:

1. An organosilicon compound selected from the group consisting of (1) An organosiloxane having per molecule at least one siloxane unit of the formula

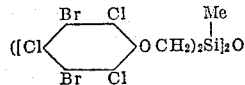

in which Y is selected from the group consisting of chlorine and bromine atoms, $a$ has a value of from 1 to 5 inclusive, $b$ has a value of from 0 to 1 inclusive, $n$ has a value of from 1 to 2 inclusive, $m$ has a value of from 0 to 3 inclusive, the sum of $a+b$ has a value of from 1 to 5 inclusive, the sum of $m+n$ has a value of from 1 to 3 inclusive, and R is selected from the group consisting of aryl, alkyl, aralkyl, cycloaliphatic, halogenated aryl, and alkenyl radicals, any remaining siloxane units in said organosiloxane being of the formula $$R'_z SiO_{\frac{4-z}{2}}$$

in which R' is selected from the group consisting of alkyl, aryl, and alkenyl radicals, halogenated derivatives of such radicals, aralkyl and cycloaliphatic radicals, and hydrogen, and $z$ is an integer of from 0 to 3 inclusive, and (2) an organosilane having the formula

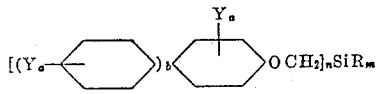

where R, Y, $a$, $b$, $n$, and $m$ are as above-defined, the sum of $a+b$ having a value of from 1 to 5, inclusive, and the sum of $m+n$ having a value of 4

2. An organosiloxane compound of the average general formula

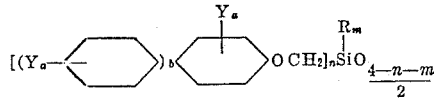

in which Y is of the group consisting of chlorine and bromine, $a$ has a value from 1 to 5 inclusive, $b$ has a value from 0 to 1 inclusive, $n$ has a value from 1 to 2 inclusive, $m$ has a value from 0 to 3 inclusive, $a+b$ has a value of from 1 to 5, inclusive, $m+n$ has a value from 1 to 4, inclusive, and R is selected from the group consisting of aryl, alkyl, aralkyl, cycloaliphatic, halogenated aryl and alkenyl radicals.

3.

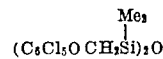

4. An organosiloxane having per molecule at least 1 soloxane unit of the formula

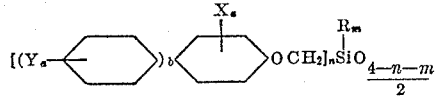

in which Y is of the group consisting of chlorine and bromine, $a$ has a value from 1 to 5 inclusive, $b$ has a value from 0 to 1 inclusive, $n$ has a value from 1 to 2 inclusive, $m$ has a value from 0 to 3 inclusive, $a+b$ has a value of from 1 to 5, inclusive, $m+n$ has a value of from 1 to 3, inclusive, and R is selected from the group consisting of aryl, alkyl, aralkyl, cycloaliphatic, halogenated aryl and alkenyl radicals, any remaining siloxane units in said organosiloxane being of the formula $$R'_z SiO_{\frac{4-z}{2}}$$

in which R' is selected from the group consisting of alkyl, aryl and alkenyl radicals, halogenated derivatives of such radicals, aralkyl and cycloaliphatic radicals, and hydrogen, and $z$ is an integer of from 0 to 3, inclusive.

5. A copolymer of the formula

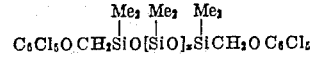

in which $x$ is an integer of at least 1.

No references cited.